United States Patent
Zhang et al.

(10) Patent No.: US 10,303,619 B2
(45) Date of Patent: May 28, 2019

(54) METHOD AND APPARATUS FOR DETERMINING PHYSICAL ADDRESS

(71) Applicant: HUAWEI TECHNOLOGIES CO., LTD., Shenzhen (CN)

(72) Inventors: Lixin Zhang, Beijing (CN); Ke Zhang, Beijing (CN); Yi Zhang, Beijing (CN); Lele Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 397 days.

(21) Appl. No.: 14/951,608

(22) Filed: Nov. 25, 2015

(65) Prior Publication Data
US 2016/0098357 A1 Apr. 7, 2016

Related U.S. Application Data

(63) Continuation of application No. PCT/CN2013/088294, filed on Dec. 2, 2013.

(30) Foreign Application Priority Data

May 29, 2013 (CN) .......................... 2013 1 0207412

(51) Int. Cl.
*G06F 12/10* (2016.01)
*G06F 12/1027* (2016.01)

(52) U.S. Cl.
CPC .... *G06F 12/1027* (2013.01); *G06F 2212/681* (2013.01); *Y02D 10/13* (2018.01)

(58) Field of Classification Search
CPC ........... G06F 12/1027; G06F 2212/681; Y02B 60/1225
See application file for complete search history.

(56) References Cited

U.S. PATENT DOCUMENTS 5,060,137 A 10/1991 Bryg et al.
5,526,504 A 6/1996 Hsu et al.
(Continued)

FOREIGN PATENT DOCUMENTS

CN 101661437 A 3/2010
CN 102662860 A 9/2012
(Continued)

OTHER PUBLICATIONS

Korean Office Action dated Mar. 20, 2017 in corresponding Korean Patent Application No. 10-2015-7036578.
(Continued)

*Primary Examiner* — Reginald G Bragdon
*Assistant Examiner* — Mehdi Namazi
(74) *Attorney, Agent, or Firm* — Staas & Halsey LLP (57) ABSTRACT

A method and an apparatus for determining a physical address are disclosed. According to the present disclosure, a page size is obtained according to the higher-order N bits of a linear address, where N is greater than 0 and less than a quantity of bits of the linear address; an index number of a translation lookaside buffer TLB is obtained according to the page size; a mask is obtained according to the page size and a supported minimum page size; a label of the TLB is obtained according to the mask; the higher-order MAC1 bits of a physical address corresponding to the linear address are obtained by searching the TLB according to the index number and the label; and the physical address is obtained according to the mask, the supported minimum page, and the higher-order MAC1 bits of the physical address.

18 Claims, 8 Drawing Sheets

(56) References Cited

U.S. PATENT DOCUMENTS

| | | | |
|---|---|---|---|
| 5,630,088 A | | 5/1997 | Gupta et al. |
| 5,796,978 A | | 8/1998 | Yoshioka et al. |
| 5,963,984 A | * | 10/1999 | Garibay, Jr. ........ G06F 12/1027 |
| | | | 711/202 |
| 7,783,859 B2 | | 8/2010 | Stecher et al. |
| 2009/0070545 A1 | | 3/2009 | Stecher |
| 2010/0257334 A1 | | 10/2010 | Kawakami |
| 2013/0111132 A1 | | 5/2013 | Zheng et al. |

FOREIGN PATENT DOCUMENTS

| | | |
|---|---|---|
| EP | 0 663 636 B1 | 7/1995 |
| KR | 10-0354772 | 12/1995 |
| KR | 10-2005-0043944 | 5/2005 |
| WO | 03/007156 A2 | 1/2003 |
| WO | WO 2004/025480 A1 | 3/2004 |

OTHER PUBLICATIONS

International Search Report dated Mar. 13, 2014, in corresponding International Application No. PCT/CN2013/088294.
Extended European Search Report dated Mar. 11, 2016 in corresponding European Patent Application No. 13885481.5.
Chinese Office Action dated Dec. 1, 2016 in corresponding Chinese Patent Application No. 201310207412.8.

* cited by examiner

METHOD AND APPARATUS FOR DETERMINING PHYSICAL ADDRESS

CROSS-REFERENCE TO RELATED APPLICATIONS

This application is a continuation of International Application No. PCT/CN2013/088294, filed on Dec. 2, 2013, which claims priority to Chinese Patent Application No. 201310207412.8, filed on May 29, 2013, both of which are hereby incorporated by reference in their entireties.

TECHNICAL FIELD

The present disclosure relates to the field of computer technologies, and in particular, to a method and an apparatus for determining a physical address.

BACKGROUND

For computer memory to be accessed, a physical address of a memory unit needs to be provided. Generally, a central processing unit (CPU) supports paging memory management. Under a condition of paging memory management, an address generated by the CPU is called a linear address or a virtual address, and the computer memory can be accessed only after the linear address is converted into a physical address by using a page table stored in a TLB.

When the computer memory is accessed by using a set associative translation lookaside buffer (TLB) structure, different TLBs may be simultaneously indexed according to different parts of the linear address. For example, for a conversion from a linear address in which a 4K page is stored to a physical address and a conversion from a linear address in which a 2M page is stored to a physical address, each TLB can determine a set associative group; in different indexed groups, a TLB table entry in a group that matches the linear address is determined, and the linear address is converted into a physical address according to the TLB table entry. It should be noted that a quantity of used types of page sizes is the same as a quantity of TLBs, and therefore, all TLBs need to be simultaneously queried when an address conversion is performed.

In addition, when a process only uses one type of page, which bits of a linear address that are to be used to index a set associative TLB are selected according to a page size used by the running process, a TLB table entry in a group of the set associative TLB is determined, and the linear address is converted into a physical address according to the TLB table entry.

However, when a physical address is obtained by using the prior art, multiple TLBs need to be simultaneously queried, which results in relatively high power consumption; or it is required that each process be restricted to using only one type of page, which leads to inflexibility.

SUMMARY

Embodiments of the present disclosure provide a method and an apparatus for determining a physical address, which may use a set associative TLB that supports multiple page sizes to obtain the physical address, and reduce power consumption.

According to a first aspect, a method for determining a physical address is provided, is used to convert a memory address into the physical address, and includes:

obtaining a page size according to the higher-order N bits of a linear address, where N is greater than 0 and less than a quantity of bits of the linear address;

obtaining an index number of a translation lookaside buffer (TLB) according to the page size;

obtaining a mask according to the page size and a supported minimum page size;

obtaining a label of the TLB according to the mask;

obtaining, by searching the TLB according to the index number and the label, the higher-order MAC1 bits of a physical address corresponding to the linear address; and obtaining the physical address according to the mask, the supported minimum page, and the higher-order MAC1 bits of the physical address, where the physical address is used for memory access.

With reference to the first aspect, in a first implementation manner of the first aspect, the obtaining a page size according to the higher-order N bits of a linear address includes:

obtaining a quantity of page offset bits of the minimum page size according to the supported minimum page size;

obtaining a first page number by taking the page offset bits of the minimum page size from the bits of the linear address; and obtaining the page size by querying a first preset table according to a value of the first page number.

With reference to the first implementation manner of the first aspect, in a second implementation manner of the first aspect, the first preset table includes a start address of a page size, an end address of the page size, and the page size; and the obtaining the page size by querying a first preset table according to a value of the first page number includes:

when the value of the first page number is greater than a start address of a first page size and the value of the first page number is less than an end address of the first page size, determining that the page size is the first page size.

With reference to the first aspect, in a third implementation manner of the first aspect, the obtaining a page size according to the higher-order N bits of a linear address includes:

obtaining a gating signal by inputting the higher-order N bits of the linear address into a decoder, where the gating signal is used to select a register from a register group;

determining a first register in the register group according to the gating signal; and determining that the page size is a page size recorded by the first register; where a page size recorded by each register in the register group is a page size recorded, after the linear address is equally divided into $2^N$ memory areas according to the higher-order N bits of the linear address, in each memory area.

With reference to any one of the foregoing implementation manners of the first aspect, in a fourth implementation manner of the first aspect, the obtaining an index number of a TLB according to the page size includes:

determining, according to a quantity of rows of records stored in the TLB, a quantity of bits that represent a row number of the TLB;

determining a quantity of page offset bits of the page size according to the page size; and after taking the page offset bits of the page size from the bits of the linear address, determining that the lower-order bits that represent a row number of the TLB and are of a remaining part of the linear address are the index number of the TLB.

With reference to any one of the foregoing implementation manners of the first aspect, in a fifth implementation manner of the first aspect, the obtaining a mask according to the page size and a supported minimum page size includes:

obtaining a quantity of bits of the mask according to $M1=LA-\log_2 P1$, where M1 represents the quantity of bits of the mask, LA represents the quantity of bits of the linear address, and P1 represents the supported minimum page size;

obtaining a quantity of 1s in the Mask according to $M2=LA-\log_2 P2$, where M2 represents the obtained quantity of 1s in the Mask, and P2 represents the page size; and obtaining the mask by setting the higher-order M2 bits in the M1 bits to 1 and setting the lower-order (M1−M2) bits in the M1 bits to 0.

With reference to the fifth implementation manner of the first aspect, in a sixth implementation manner of the first aspect, the obtaining a label of the TLB according to the mask includes:

obtaining a second address by taking the lower-order ($\log_2 P1$) bits from the linear address; and obtaining the label of the TLB by performing a bitwise AND operation on the mask and the second address.

With reference to any one of the foregoing implementation manners of the first aspect, in a seventh implementation manner of the first aspect, the obtaining, by searching the TLB according to the index number and the label, a physical address corresponding to the linear address includes:

obtaining a first record in the TLB by searching the TLB according to the index number of the TLB, where the TLB includes at least one row of record, each row of record includes at least one pair of data, and each pair of the data includes a label and a physical address corresponding to the label; and comparing the label of the TLB with each label in at least one pair of data included in the first record, where when the label of the TLB is the same as a first label included in the first record, a physical address that is corresponding to the first label and is in the first record is the higher-order MAC1 bits of the physical address corresponding to the linear address.

With reference to any one of the foregoing implementation manners of the first aspect, in an eighth implementation manner of the first aspect, the obtaining the physical address according to the mask, the supported minimum page size, and the higher-order MAC1 bits of the physical address includes:

obtaining the intermediate MAC2 bits of the physical address by negating the mask and performing a bitwise AND operation on the negated Mask and the second address;

obtaining the lower-order ($\log_2 P1$) bits of the physical address, where P1 represents the supported minimum page size; and obtaining the physical address by combining the higher-order MAC1 bits of the physical address, the intermediate MAC2 bits of the physical address, and the lower-order MAC3 bits of the physical address in sequence.

According to a second aspect, an apparatus for determining a physical address is provided, is configured to convert a memory address into the physical address, and includes:

a page size decoder, configured to obtain a page size according to the higher-order N bits of a linear address, where N is greater than 0 and less than a quantity of bits of the linear address;

an index processor, configured to obtain an index number of a translation lookaside buffer TLB according to the page size;

a Mask decoder, configured to obtain a mask according to the page size and a supported minimum page size;

a label processor, configured to obtain a label of the TLB according to the mask; and a physical address determining unit, configured to obtain, by searching the TLB according to the index number and the label, the higher-order MAC1 bits of a physical address corresponding to the linear address; where the physical address determining unit is further configured to obtain the physical address according to the mask, the supported minimum page, and the higher-order MAC1 bits of the physical address, where the physical address is used for memory access.

With reference to the second aspect, in a first implementation manner of the second aspect, the page size decoder includes:

a calculating module, configured to obtain a quantity of page offset bits of the minimum page size according to the supported minimum page size; where the calculating module is further configured to obtain a first page number by taking the page offset bits of the minimum page size from the bits of the linear address; and a page size obtaining module, configured to obtain the page size by querying a first preset table according to a value of the first page number.

With reference to the first implementation manner of the second aspect, in a second implementation manner of the second aspect, the first preset table includes a start address of a page size, an end address of the page size, and the page size; and the page size obtaining module is configured to:

when the value of the first page number is greater than a start address of a first page size and the value of the first page number is less than an end address of the first page size, determine that the page size is the first page size.

With reference to the second aspect, in a third implementation manner of the second aspect, the page size decoder includes:

a decoder, configured to obtain a gating signal by inputting the higher-order N bits of the linear address into the decoder, where the gating signal is used to select a register from a register group; and the register, configured to determine a first register in the register group according to the gating signal; where the register is further configured to determine that the page size is a page size recorded by the first register; and a page size recorded by each register in the register group is a page size recorded, after the linear address is equally divided into $2^N$ memory areas according to the higher-order N bits of the linear address, in each memory area.

With reference to any one of the foregoing implementation manners of the second aspect, in a fourth implementation manner of the second aspect, the index processor includes:

an index decoder, configured to determine, according to a quantity of rows of records stored in the TLB, a quantity of bits that represent a row number of the TLB; where the index decoder is further configured to determine a quantity of page offset bits of the page size according to the page size; and a multiplexer MUX, configured to: after taking the page offset bits of the page size from the bits of the linear address, determine that the lower-order bits that represent a row number of the TLB and are of a remaining part of the linear address are the index number of the TLB.

With reference to any one of the foregoing implementation manners of the second aspect, in a fifth implementation manner of the second aspect, the Mask decoder is configured to:

obtain a quantity of bits of the Mask according to $M1=LA-\log_2 P1$, where M1 represents the quantity of bits of the mask, LA represents the quantity of bits of the linear address, and P1 represents the supported minimum page size;

obtain a quantity of 1s in the Mask according to $M2=LA-\log_2 P2$, where M2 represents the obtained quantity of 1s in the Mask, and P2 represents the page size; and obtain the mask by setting the higher-order M2 bits in the M1 bits to 1 and setting the lower-order (M1−M2) bits in the M1 bits to 0.

With reference to the foregoing fifth implementation manner of the second aspect, in a sixth implementation manner of the second aspect, the label processor is configured to:

obtain a second address by taking the lower-order ($\log_2$ P1) bits from the linear address; and obtain the label of the TLB by performing a bitwise AND operation on the mask and the second address.

With reference to the foregoing sixth implementation manner of the second aspect, in a seventh implementation manner of the second aspect, the physical address determining unit includes:

a first record determining module, configured to obtain a first record in the TLB by searching the TLB according to the index number of the TLB, where the TLB includes at least one row of record, each row of record includes at least one pair of data, and each pair of the data includes a label and a physical address corresponding to the label; and a physical address determining module, configured to compare the label of the TLB with each label in at least one pair of data included in the first record, where when the label of the TLB is the same as a first label included in the first record, a physical address that is corresponding to the first label and is in the first record is the higher-order MAC1 bits of the physical address corresponding to the linear address.

With reference to the foregoing seventh implementation manner of the second aspect, in an eighth implementation manner of the second aspect, the physical address determining unit includes:

a calculating module, configured to obtain the intermediate MAC2 bits of the physical address by negating the mask and performing a bitwise AND operation on the negated Mask and the second address; where the calculating module is further configured to obtain the lower-order ($\log_2$ P1) bits of the physical address, where P1 represents the supported minimum page size; and a combining module, configured to obtain the physical address by combining the higher-order MAC1 bits of the physical address, the intermediate MAC2 bits of the physical address, and the lower-order ($\log_2$ P1) bits of the physical address in sequence.

The embodiments of the present disclosure provide a method and an apparatus for determining a physical address. Compared with the prior art in which multiple TLBs need to be simultaneously queried, which results in relatively high power consumption, or it is required that each process be restricted to using only one type of page, which leads to inflexibility, a set associative TLB that supports multiple page sizes may be used to obtain a physical address in the embodiments of the present disclosure, so that a process uses different page sizes in different linear address areas and power consumption is reduced.

BRIEF DESCRIPTION OF DRAWINGS

To describe the technical solutions in the embodiments of the present disclosure more clearly, the following briefly introduces the accompanying drawings required for describing the embodiments.

DESCRIPTION OF EMBODIMENTS

The following clearly describes the technical solutions in the embodiments of the present disclosure with reference to the accompanying drawings in the embodiments of the present disclosure.

Figure 1:
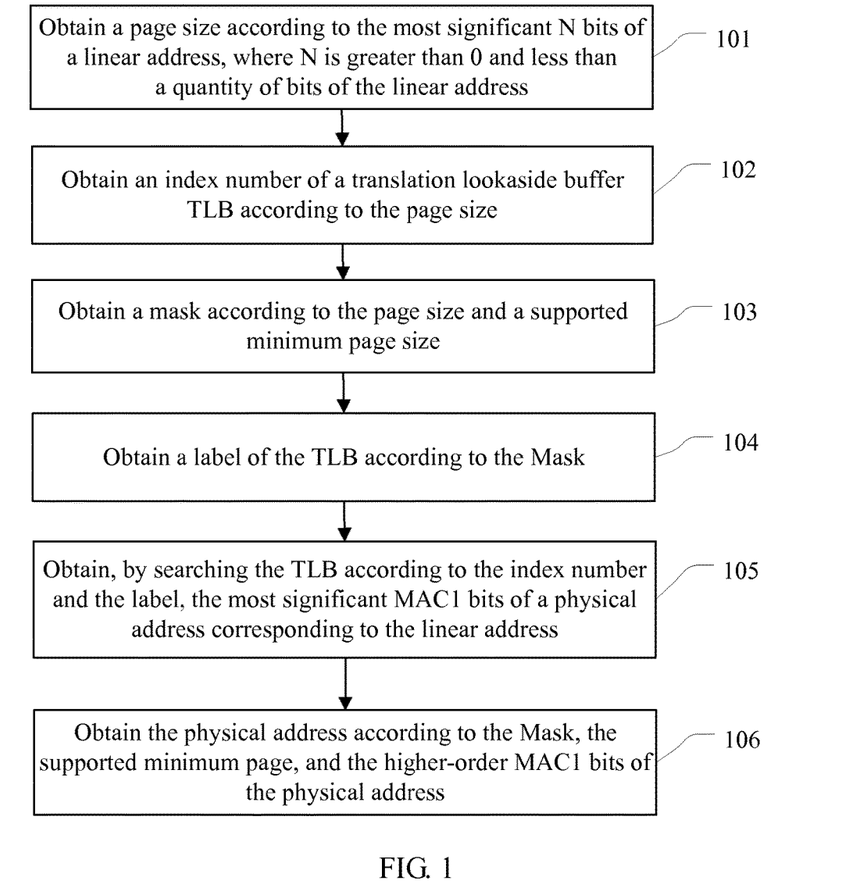
FIG. 1 is a flowchart of a method for determining a physical address according to an embodiment of the present disclosure.

An embodiment of the present disclosure provides a method for determining a physical address, where the method is executed by a CPU and is used to convert a memory address into a physical address. The method includes:

Step 101: Obtain a page size according to the higher-order N bits of a linear address, where N is greater than 0 and less than a quantity of bits of the linear address.

The linear address is an address generated by the CPU, and may also be called a virtual address or a logical address. The linear address can be used for memory access only after being converted into a physical address by using a page table, that is, the page table is used to convert the linear address into a physical address. The page table may be stored in the memory. When a conversion from a linear address to a physical address is performed, the page table in the memory needs to be accessed, thereby leading to a relatively low speed of the conversion from a linear address to a physical address. A TLB in the CPU may also store the page table. If the page table is stored in the TLB, the conversion from a linear address to a physical address may be performed in the CPU, and there is no need to access the memory, which accelerates the speed of the conversion from a linear address to a physical address.

Because indexes used by different page sizes in a set associative process are at different locations of the linear address, during the conversion from the linear address to a physical address, it is necessary to know which part of the linear address is used as an index to index the TLB. Optionally, the higher-order N bits of the linear address are used as input of a page size decoder, which may obtain the page size. N is greater than 0 and less than the quantity of bits of the linear address. That is, when the linear address has 32 bits, the higher-order seven bits of the linear address may be used as the input of the page size decoder, so as to obtain the page size.

Step 102: Obtain an index number of a translation lookaside buffer (TLB) according to the page size.

Optionally, after the page size is obtained, the page size is used as input of an index decoder, which may obtain a selection signal of a multiplexer (MUX), thereby obtaining the index number. The MUX represents a multiplexer that selects indexes corresponding to all page sizes.

For example, a quantity of bits that represent an entry number of the TLB is determined according to a quantity of entries of the TLB, that is, when the TLB includes 512 entries or the TLB stores 512 rows of records, nine bits are needed to represent the index.

A quantity of page offset bits of the page size is determined according to the page size. When the page size is 4M, the page offset bits of the page size are 22 bits.

After the page offset bits of the page size are taken from the bits of the linear address, the lower-order bits that represent an entry number of the TLB and are of a remaining part of the linear address are determined as the index number of the TLB. When the linear address has 32 bits, 10 bits are obtained after the page offset bits of the page size are taken from the bits of the linear address, and the lower-order seven bits of the 10 bits are determined as the index number of the TLB, that is, the MUX selects bits 22 to 28 of the linear address as the index.

Step 103: Obtain a mask according to the page size and a supported minimum page size.

Optionally, after the page size is obtained, the page size is used as input of a mask decoder, thereby obtaining the mask.

For example, a quantity of bits of the mask is obtained according to $M1=LA-\log_2 P1$, where M1 represents the quantity of bits of the mask, LA represents the quantity of bits of the linear address, and P1 represents a supported minimum page size;

a quantity of 1s in the mask is obtained according to $M2=LA-\log_2 P2$, where M2 represents the obtained quantity of 1s in the mask, and P2 represents the page size; and the mask is obtained by setting the higher-order M2 bits in the M1 bits to 1 and setting the lower-order (M1−M2) bits in the M1 bits to 0.

Step 104: Obtain a label of the TLB according to the mask.

The label of the TLB is obtained by performing a bitwise AND operation on the mask and a remaining part of the linear address from which page offset bits of a minimum page are taken.

Optionally, a second address is obtained by taking the lower-order ($\log_2$ P1) bits from the linear address; and the label of the TLB is obtained by performing a bitwise AND operation on the mask and the second address.

Step 105: Obtain, by searching the TLB according to the index number and the label, the higher-order MAC1 bits of a physical address corresponding to the linear address.

In this embodiment, the TLB no longer needs a mask field but includes only a label field and a physical address field. The TLB includes at least one row of record, each row of record includes at least one pair of data, and each pair of the data includes a label and a physical address corresponding to the label.

Optionally, a first record in the TLB is obtained by searching the TLB according to the index number of the TLB.

The label is compared with each label in at least one pair of data included in the first record. When the label is the same as a first label included in the first record, a physical address that is corresponding to the first label and is in the first record is the higher-order MAC1 bits of the physical address corresponding to the linear address.

Step 106: Obtain the physical address according to the mask, the supported minimum page, and the higher-order MAC1 bits of the physical address, where the physical address is used for memory access.

The obtaining the physical address according to the mask, the supported minimum page size, and the higher-order MAC1 bits of the physical address includes: obtaining the intermediate MAC2 bits of the physical address by negating the mask and performing a bitwise AND operation on the negated Mask and the second address; obtaining the lower-order ($\log_2$ P1) bits of the physical address, where P1 represents the supported minimum page size; and obtaining the physical address by combining the higher-order MAC1 bits of the physical address, the intermediate MAC2 bits of the physical address, and the lower-order ($\log_2$ P1) bits of the physical address in sequence.

It should be noted that a length of the label field in the TLB is fixed to a length of a label of the minimum page, and lower-order bits of a label of a large page need to be set to 0. For example, the linear address has 32 bits, the minimum page is 4K, the quantity of page offset bits of the minimum page is 12, and the length of the label field in the TLB is fixed to 20 bits; if the large page is 4M, and a quantity of page offset bits of the page is 22, valid label bits in the label of the large page are 10 bits; the length of the label field in the TLB is fixed to 20 bits, and therefore the lower-order 10 bits need to be set to 0.

This embodiment of the present disclosure provides a method for determining a physical address, in which a page size is obtained according to the higher-order N bits of a linear address, where N is greater than 0 and less than a quantity of bits of the linear address; an index number of a translation lookaside buffer (TLB) is obtained according to the page size; a label of the TLB is obtained according to the page size; a physical address corresponding to the linear address is obtained by searching the TLB according to the index number and the label. A set associative TLB that supports multiple page sizes may be used to obtain the physical address, so that a process uses different page sizes in different linear address areas and power consumption is reduced.

Figure 2:
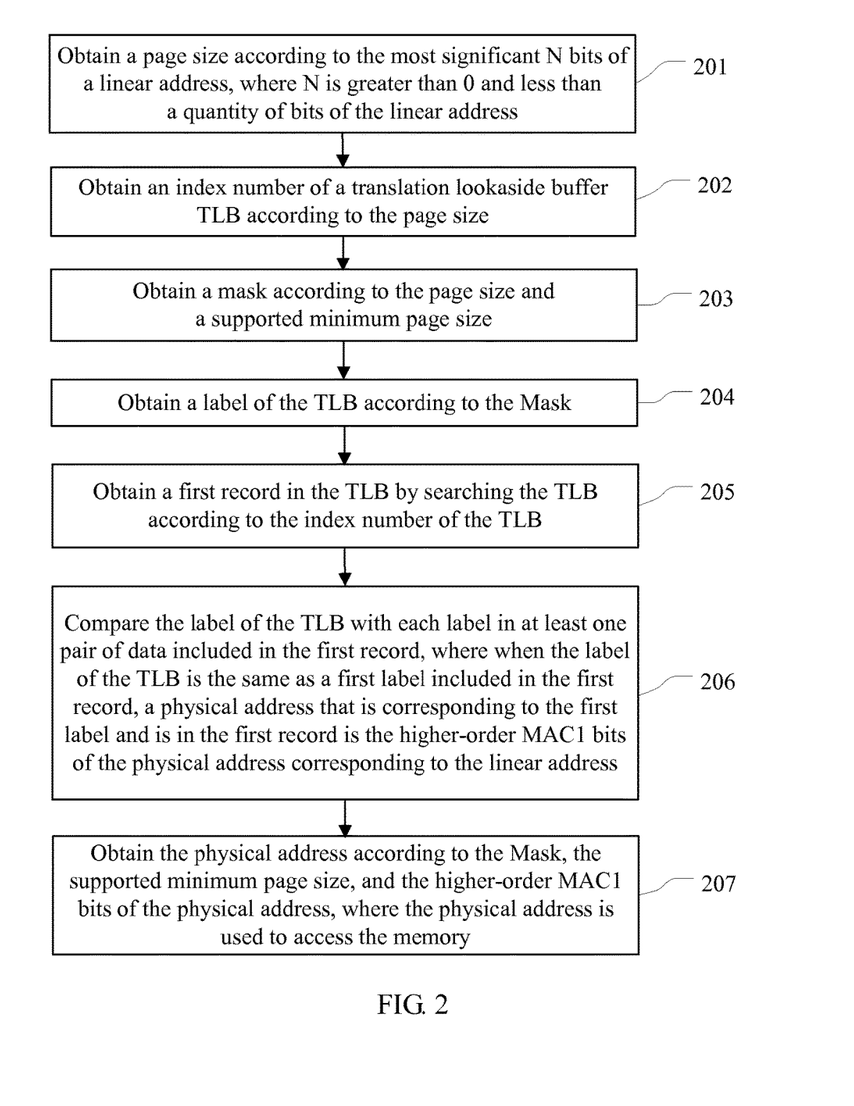
FIG. 2 is a flowchart of another method for determining a physical address according to an embodiment of the present disclosure.

An embodiment of the present disclosure provides another method for determining a physical address, which is used to convert a memory address into the physical address. As shown in FIG. 2, the method includes:

Step 201: Obtain a page size according to the higher-order N bits of a linear address, where N is greater than 0 and less than a quantity of bits of the linear address.

Figure 3:
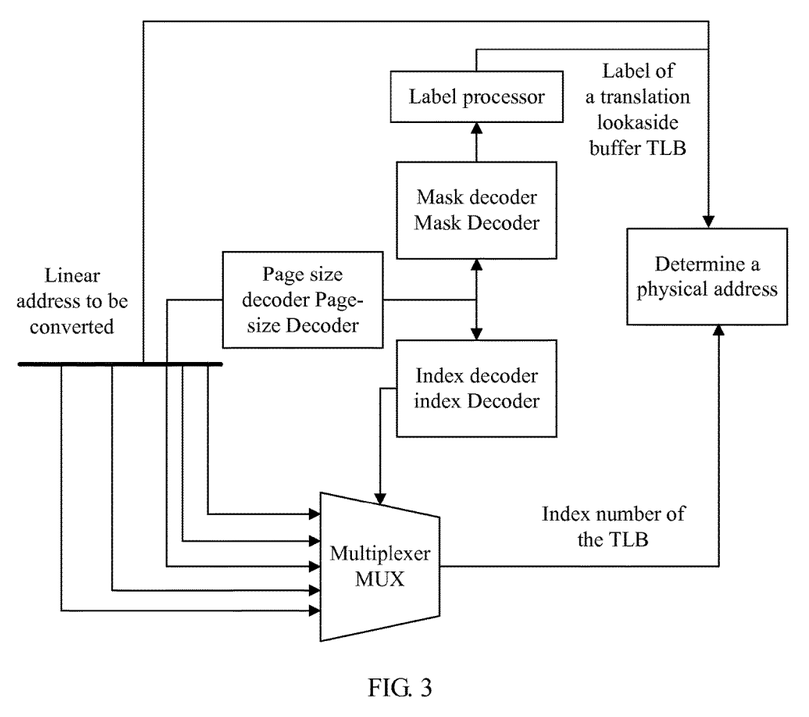
FIG. 3 is a schematic diagram of a method for determining a physical address according to an embodiment of the present disclosure.

Optionally, as shown in FIG. 3, the page size is obtained by using a page size decoder, where the page size decoder represents a logical module that obtains the page size according to higher-order bits of the linear address.

Figure 4:
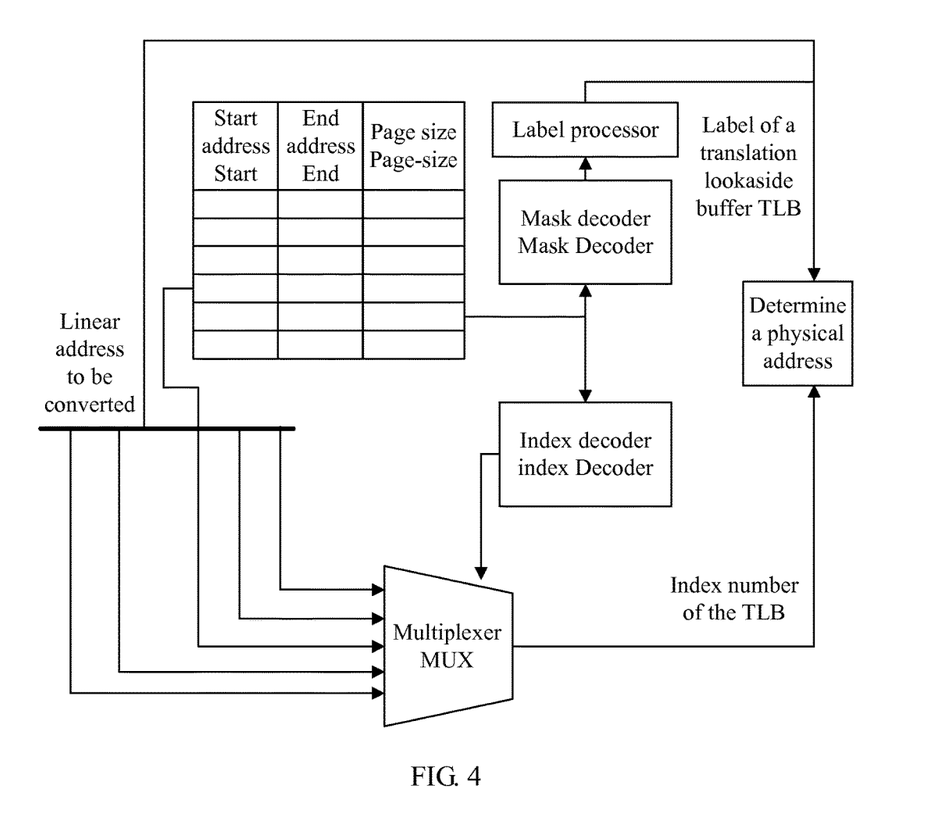
FIG. 4 is a schematic diagram of another method for determining a physical address according to an embodiment of the present disclosure.

In this embodiment, the page size decoder may be implemented in the following two manners:

Manner 1: As shown in FIG. 4, the page size decoder is implemented by using a preset table, where the preset table is formed by a start address Start of a page size, an end address End of the page size, and the page size Page-size, and the preset table is written and modified by an operating system.

Optionally, a quantity of page offset bits of a minimum page size is first obtained according to a supported minimum page size.

For example, the minimum page size that the system may support is 4 KB, and it is obtained, by calculation by using $\log_2 (4K)=12$, that a quantity of page offset bits of the minimum page size is 12. Therefore, a memory area of a page size that is specified by Page-size and recorded by Start and End may be a start address and an end address that are of a measurement step of 4 KB.

A first page number is obtained by taking the page offset bits of the minimum page size from the bits of the linear address.

For example, the linear address has 48 bits, and then the first page number is (48-12) bits, that is, the first page number is 36 bits at most.

The page size is obtained by querying a first preset table according to a value of the determined first page number.

The first page number is represented by using the binary system. The binary number is converted into a decimal number, and the decimal number may represent the value of the page number.

Optionally, when the value of the first page number is greater than a start address of a first page size and the value of the first page number is less than an end address of the first page size, it is determined that the page size is the first page size.

It should be noted that because a parallel comparison needs to be performed between 36 bits of the linear address and Start and End of each entry in the preset table, a quantity of rows that need to be set in the preset table is relatively small, so as to reduce the time for searching the page size. For example, seven entries may be set in the preset table, and then the linear address needs to be divided into seven memory areas, where a page size of each memory area may be any one of 4 KB, 8 KB, 16 KB, 32 KB, 64 KB, 128 KB, . . . , 32 G, 64 G, 128 G, 256 G, and 512 G.

Figure 5:
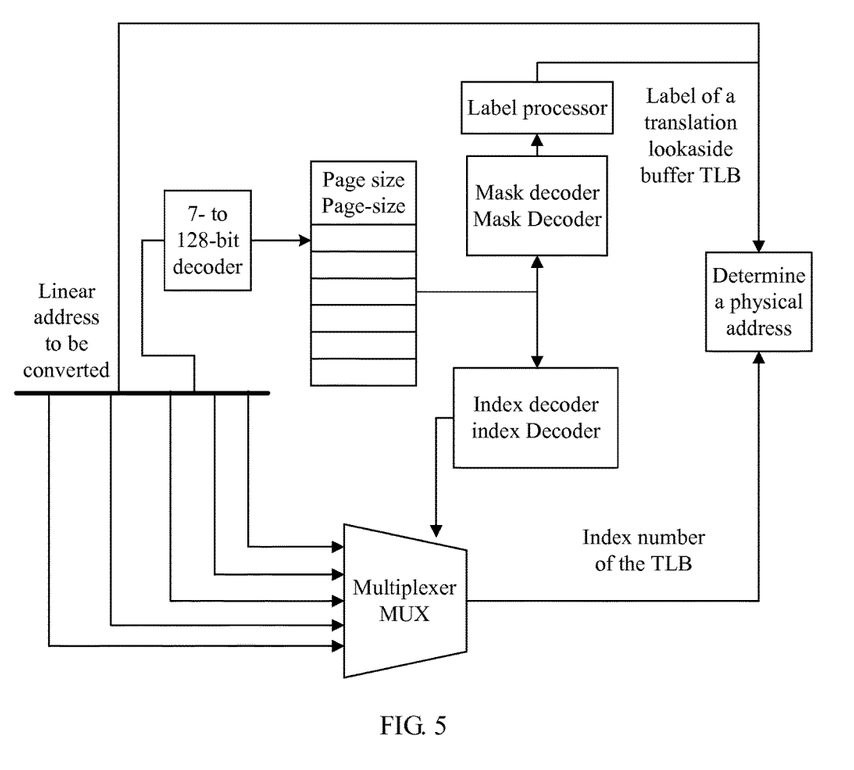
FIG. 5 is a schematic diagram of another method for determining a physical address according to an embodiment of the present disclosure.

Manner 2: As shown in FIG. 5, the page size decoder is implemented by using a combination of a 7 bits to 128 bits decoder and a page size register group, and is written and modified by the operating system.

For example, a page size recorded by each register in the register group is a page size recorded, after the linear address is equally divided into $2^N$ memory areas according to the higher-order N bits of the linear address in each memory area.

The linear address has 48 bits, and the linear address is equally divided into several memory areas of 2 TB by using the higher-order N bits of the linear address. For example, the linear address is equally divided into 128 memory areas of 2 TB by using the higher-order seven bits of the linear address, where the page size of each memory area may be any one of 4 KB, 8 KB, 16 KB, 32 KB, 64 KB, 128 KB, . . . , 32 G, 64 G, 128 G, 256 G, and 512 G.

Optionally, a gating signal is obtained by inputting the higher-order N bits of the linear address into a decoder, where the gating signal is used to select a register from the register group. For example, a gating signal is obtained by inputting the higher-order seven bits of the linear address to the decoder.

A first register in the register group is determined according to the gating signal. Optionally, a register is found from the register group according to output of the decoder. For example, there are four registers numbered 0-3 in the register group; when the gating signal is 2, the selected register is register 2. It should be noted that the "first" in the "first register" is not for ordering, but for ease of description. The first register herein may refer to any register in the register group. For example, when the gating signal is 2, the first register may be register 2; and when the gating signal is 0, the first register is register 0.

It is determined that the page size is a page size recorded by the first register.

Step 202: Obtain an index number of a translation lookaside buffer TLB according to the page size.

Optionally, as shown in FIG. 3, the index number index of the TLB is obtained by using an index decoder and a MUX.

Optionally, a quantity of bits that represent a row number of the TLB is determined according to a quantity of rows of records stored in the TLB. At least one row of record is stored in the TLB. For example, when 512 entries are stored in the TLB, that is, 512 rows of records are stored in the TLB, [$\log_2 (512)=9$] bits are needed to represent the index, that is, the index is formed by a binary number of nine bits.

The quantity of page offset bits of the page size is determined according to the page size. For example, when the page size is 4M, the page offset bits of the page size are 22 bits.

After the page offset bits of the page size are taken from the bits of the linear address, the lower-order bits that represent an entry number of the TLB and are of a remaining part of the linear address are determined as the index number of the TLB. When the linear address has 32 bits, 10 bits are obtained after the page offset bits of the page size are taken from the bits of the linear address, and seven lower-order bits of the 10 bits are determined as the index number of the TLB, that is, the MUX selects bits 22 to 28 of the linear address as the index to output.

Step 203: Obtain a mask according to the page size and a supported minimum page size.

Optionally, as shown in FIG. 3, the Mask is obtained by using a Mask decoder.

A quantity of bits of the mask is obtained according to M1=LA−$\log_2$ P1, where M1 represents the quantity of bits of the mask, LA represents the quantity of bits of the linear address, and P1 represents the supported minimum page size.

For example, the linear address has 48 bits, and the supported minimum page size is 4K; then, the quantity of bits of the mask is [48−$\log_2$ (4K)=36]. In these 36 bits, the higher-order bits are 1s and the lower-order bits are 0s.

A quantity of 1s in the mask is obtained according to M2=LA−log 2 P2, where M2 represents the obtained quantity of 1s in the mask, and P2 represents the page size.

When the page size is 4M, the quantity of 1s in the mask is [48−$\log_2$ (4M)=26].

The mask is obtained by setting the higher-order M2 bits in the M1 bits to 1 and setting the lower-order (M1−M2) bits in the M1 bits to 0.

For example, the higher-order 26 bits in the mask are 1s, and the lower-order (36−26=10) bits in the mask are 0s; for example, the mask is "111111111111111111111111111100000 00000".

Step 204: Obtain a label of the TLB according to the mask.

A second address is obtained by taking the lower-order ($\log_2$ P1) bits from the linear address. For example, the second address may be the higher-order [48−$\log_2$ (4K)=36] bits of the linear address.

The label of the TLB is obtained by performing a bitwise AND operation on the mask and the second address.

Step 205: Obtain a first record in the TLB by searching the TLB according to the index number of the TLB.

The TLB includes at least one row of record, each row of record includes at least one pair of data, and each pair of the data includes a label and a physical address corresponding to the label. The TLB no longer includes a mask value, so that setting of the TLB is simpler and querying the physical address is faster.

For example, the obtained index number of the TLB is represented by nine bits, and the TLB has 512 rows of records; then, one row of record in the TLB is obtained according to a value of the index number. For example, the nine bits of the index number represent a value of 318, and then it may be determined that a record in the $318^{th}$ row in the TLB is the first record.

Step 206: Compare the label of the TLB with each label in at least one pair of data included in the first record, where when the label of the TLB is the same as a first label included in the first record, a physical address that is corresponding to the first label and is in the first record is the higher-order MAC1 bits of the physical address corresponding to the linear address.

Comparing the obtained label of the TLB with each label in at least one pair of data included in the first record includes: successively comparing the label of the TLB with labels in at least one pair of data included in the first record one by one. When the label of the TLB is compared with a label in any pair of data, optionally, a binary number that represents the label of the TLB is compared with a binary number that represents the label and is in the any pair of data, or a value of the label of the TLB is compared with a value of the label in the any pair of data.

When the label of the TLB is different from the first label included in the first record, the label of the TLB is further compared with another label included in the first record.

Step 207: Obtain the physical address according to the mask, the supported minimum page size, and the higher-order MAC1 bits of the physical address, where the physical address is used for memory access.

The intermediate MAC2 bits of the physical address are obtained by negating the mask and performing a bitwise AND operation on the negated Mask and the second address; for example, "00000000001111111111111111111111 1111111" is obtained by negating the mask, and then "0000000000xxxxxxxxxxxxxxxxxxxxxxxxxxxx" is obtained by performing the bitwise AND operation on the negated Mask and the second address, where "xxxxxxxxxxxxxxxxxxxxxxxxxxxx" represents the intermediate MAC2 bits of the physical address.

The lower-order ($\log_2$ P1) bits of the physical address are obtained according to the supported minimum page size, where P1 represents the supported minimum page size. For example, the supported minimum page size is 4K, and then $\log_2$ (4K)=12, that is, the page offset bits of the minimum page size are the lower-order 12 bits of the physical address, that is, bits 0-11.

The physical address is obtained by combining the higher-order MAC1 bits that are obtained by querying by the TLB, the intermediate MAC2 bits of the physical address, and the lower-order ($\log_2$ P1) bits of the physical address in sequence.

In this step, after the physical address corresponding to the linear address is obtained, a pin of the CPU sends the physical address to a storage system, so that a subsequent operation is performed.

This embodiment of the present disclosure provides a method for determining a physical address, in which a page size is obtained according to the higher-order N bits of a linear address, where N is greater than 0 and less than a quantity of bits of the linear address; an index number of a translation lookaside buffer TLB is obtained according to the page size; a label of the TLB is obtained according to the page size; a physical address corresponding to the linear address is obtained by searching the TLB according to the index number and the label. A set associative TLB that supports multiple page sizes may be used to obtain the physical address, so that a process uses different page sizes in different linear address areas and power consumption is reduced.

Figure 6:
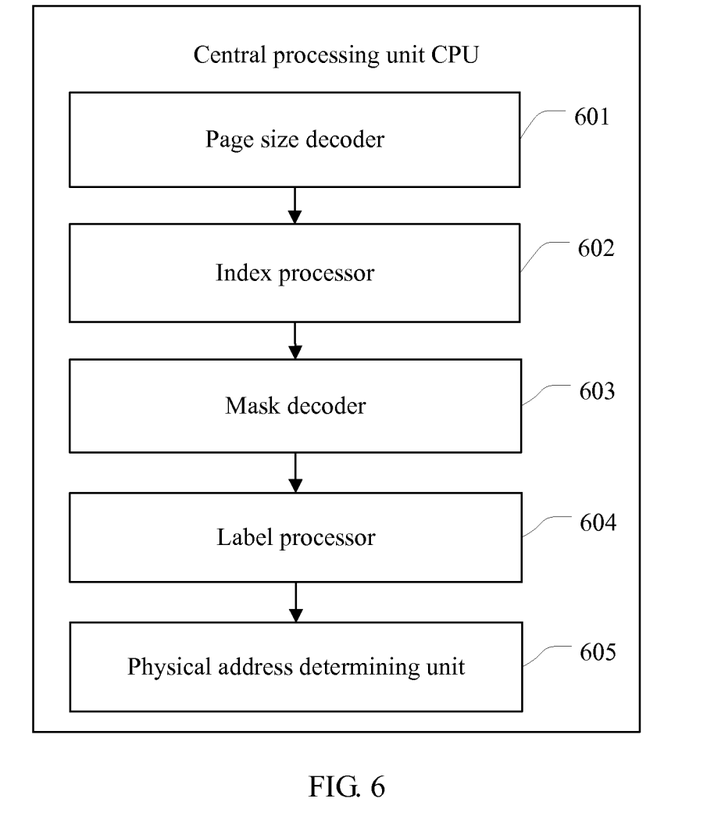
FIG. 6 is a simplified block diagram of an apparatus for determining a physical address according to an embodiment of the present disclosure.

An embodiment of the present disclosure provides an apparatus for determining a physical address, where the apparatus may be a CPU, and is configured to convert a memory address into the physical address. As shown in FIG. 6, the apparatus includes: a page size decoder 601, an index processor 602, a Mask decoder 603, a label processor 604, and a physical address determining unit 605.

The page size decoder 601 is configured to obtain a page size according to the higher-order N bits of a linear address, where N is greater than 0 and less than a quantity of bits of the linear address, and different linear address areas may use different page sizes.

The index processor 602 is configured to obtain an index number of a translation lookaside buffer (TLB) according to the page size.

The Mask decoder 603 is configured to obtain a Mask according to the page size and a supported minimum page size.

Further optionally, the Mask decoder 603 is configured to obtain a quantity of bits of the Mask according to M1=LA−$\log_2$ P1, where M1 represents the quantity of bits of the mask, LA represents the quantity of bits of the linear address, and P1 represents the supported minimum page size.

The mask decoder 603 is further configured to obtain a quantity of 1s in the Mask according to M2=LA−$\log_2$ P2, where M2 represents the obtained quantity of 1s in the Mask, and P2 represents the page size.

The mask decoder 603 is further configured to obtain the mask by setting the higher-order M2 bits in the M1 bits to 1 and setting the lower-order (M1−M2) bits in the M1 bits to 0.

The label processor 604 is configured to obtain a label of the TLB according to the mask.

Further optionally, the label processor 604 is configured to obtain a second address by taking the lower-order ($\log_2$ P1) bits from the linear address.

The label processor 604 is further configured to obtain the label of the TLB by performing a bitwise AND operation on the mask and the second address.

The physical address determining unit 605 is configured to obtain, by searching the TLB according to the index number and the label, the higher-order MAC1 bits of a physical address corresponding to the linear address.

The physical address determining unit 605 is further configured to obtain the physical address according to the mask, the supported minimum page size, and the higher-order MAC1 bits of the physical address, where the physical address is used for memory access.

Figure 7:
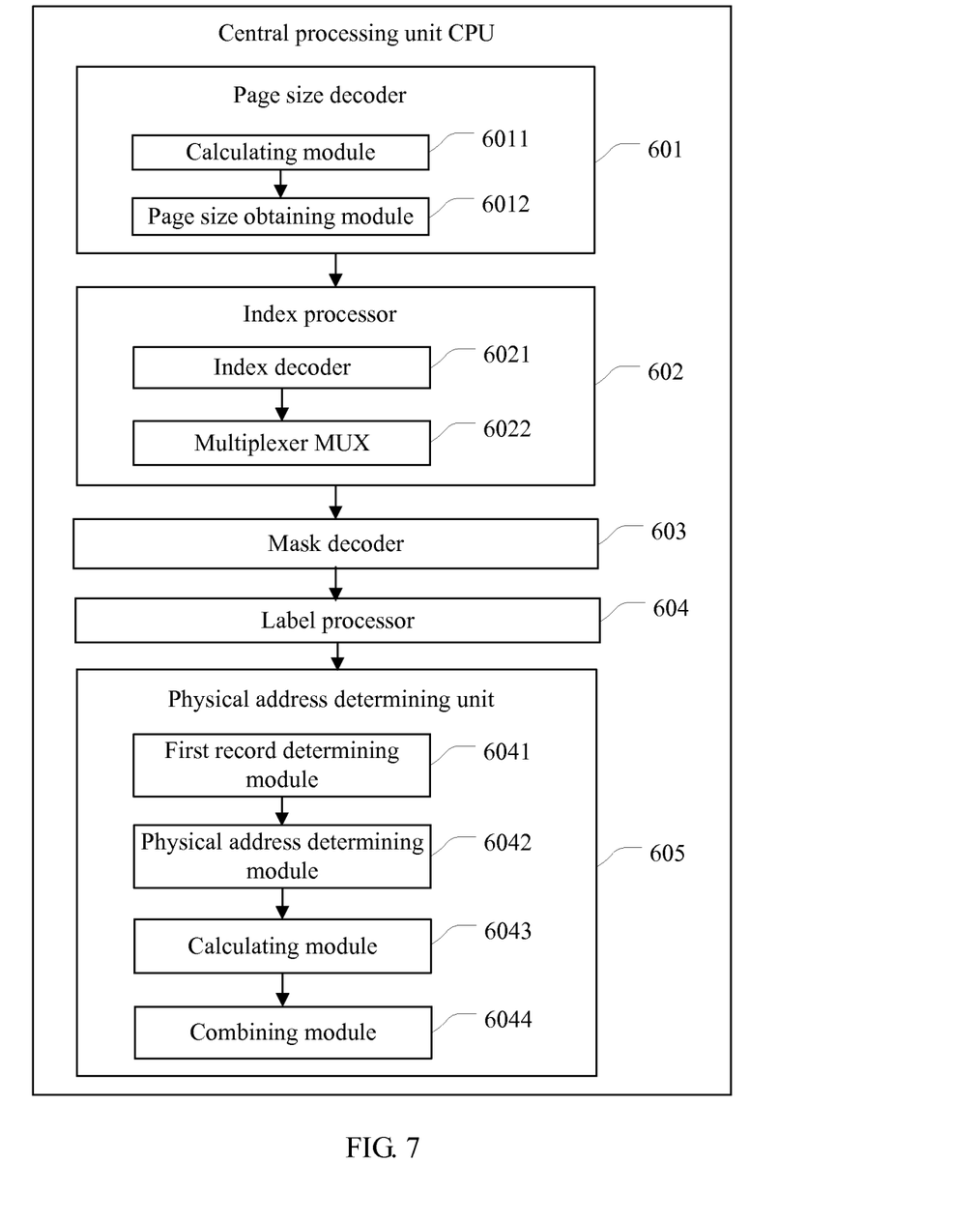
FIG. 7 is a simplified block diagram of another apparatus for determining a physical address according to an embodiment of the present disclosure.

Further optionally, as shown in FIG. 7, the page size decoder 601 includes: a calculating module 6011 and a page size obtaining module 6012.

The calculating module 6011 is configured to obtain a quantity of page offset bits of the minimum page size according to the supported minimum page size.

The calculating module 6011 is further configured to obtain a first page number by taking the page offset bits of the minimum page size from the bits of the linear address. For example, the minimum page size that the system may support is 4 KB, and it is obtained, by calculation by using $\log_2$ (4K)=12, that a quantity of page offset bits of the minimum page size is 12. Therefore, a memory area of a page size that is specified by Page-size and recorded by Start and End may be a start address and an end address that are of a measurement step of 4 KB.

The page size obtaining module 6012 is configured to obtain the page size by querying a first preset table according to a value of the first page number.

Further, the first preset table includes a start address Start of a page size, an end address End of the page size, and the page size Page-size, and the preset table is written and modified by an operating system.

The page size obtaining module 6012 is configured to: when the value of the first page number is greater than a start address of a first page size and the value of the first page number is less than an end address of the first page size, determine that the page size is the first page size.

It should be noted that because a parallel comparison needs to be performed between 36 bits of the linear address and Start and End of each entry in the preset table, a quantity of rows that need to be set in the preset table is relatively small, so as to reduce the time for searching the page size. For example, seven entries may be set in the preset table, and then the linear address needs to be divided into seven memory areas, where a page size of each memory area may be any one of 4 KB, 8 KB, 16 KB, 32 KB, 64 KB, 128 KB, . . . , 32 G, 64 G, 128 G, 256 G, and 512 G.

Figure 8:
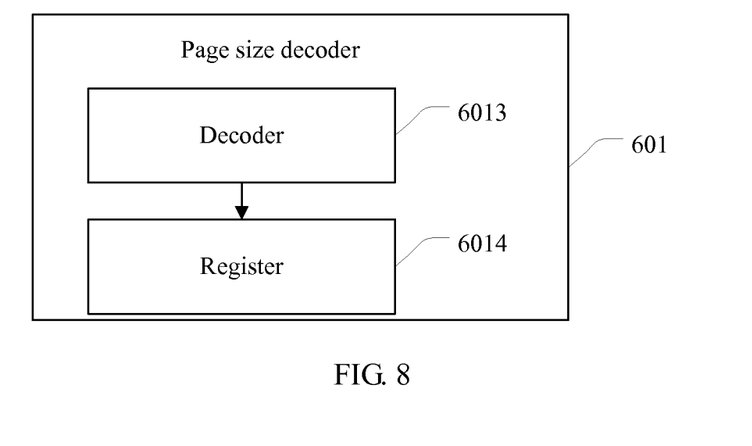
FIG. 8 is a simplified block diagram of a page size decoder according to an embodiment of the present disclosure.

Further optionally, as shown in FIG. 8, the page size decoder 601 includes: a decoder 6013 and a register 6014.

The decoder 6013 is configured to obtain a gating signal by inputting the higher-order N bits of the linear address into the decoder, where the gating signal is used to select a register from a register group.

The register 6014 is configured to determine a first register in the register group according to the gating signal.

The register 6014 is further configured to determine that the page size is a page size recorded by the first register.

A page size recorded by each register in the register group is a page size recorded, after the linear address is equally divided into $2^N$ memory areas according to the higher-order N bits of the linear address, in each memory area. For example, the linear address has 48 bits, and the linear address is equally divided into several memory areas of 2 TB by using the higher-order N bits of the linear address. For example, the linear address is equally divided into 128 memory areas of 2 TB by using the higher-order seven bits of the linear address, where the page size of each memory area may be any one of 4 KB, 8 KB, 16 KB, 32 KB, 64 KB, 128 KB, . . . , 32 G, 64 G, 128 G, 256 G, and 512 G.

Further optionally, as shown in FIG. 7, when the index processor 602 obtains the index number of the translation lookaside buffer (TLB) according to the page size, the index processor 602 includes: an index decoder 6021 and a multiplexer MUX 6022.

The index decoder 6021 is configured to determine, according to a quantity of rows of records stored in the TLB, a quantity of bits that represent a row number of the TLB; for example, when 512 entries are stored in the TLB, that is, 512 rows of records are stored in the TLB, [$\log_2$ (512)=9] bits are needed to represent the index, that is, the index is formed by a binary number of nine bits.

The index decoder 6021 is further configured to determine a quantity of page offset bits of the page size according to the page size; for example, when the page size is 4M, the page offset bits of the page size are 22 bits.

The multiplexer MUX 6022 is configured to: after taking the page offset bits of the page size from the bits of the linear address, determine that the lower-order bits that represent a row number of the TLB and are of a remaining part of the linear address are the index number of the TLB. When the linear address has 32 bits, 10 bits are obtained after the page offset bits of the page size are taken from the bits of the linear address, and seven lower-order bits of the 10 bits are determined as the index number of the TLB, that is, the MUX selects bits 22 to 28 of the linear address as the index to output.

Further optionally, as shown in FIG. 7, the physical address determining unit 605 includes: a first record determining module 6051, a physical address determining module 6052, a calculating module 6053 and a combining module 6054.

The first record determining module 6051 is configured to obtain a first record in the TLB by searching the TLB according to the index number of the TLB, where the TLB includes at least one row of record, each row of record includes at least one pair of data, and each pair of the data includes a label and a physical address corresponding to the label. For example, the obtained index number of the TLB is represented by nine bits, and the TLB has 512 rows of records; then, one row of record in the TLB is obtained according to a value of the index number. For example, the nine bits of the index number represent a value of 318, and then it may be determined that a record in the $318^{th}$ row in the TLB is the first record.

The physical address determining module 6052 is configured to compare the label of the TLB with each label in at least one pair of data included in the first record, where when the label of the TLB is the same as a first label included in the first record, a physical address that is corresponding to the first label and is in the first record is the higher-order MAC1 bits of the physical address corresponding to the linear address.

When the label of the TLB is different from the first label included in the first record, the label of the TLB is further compared with another label included in the first record.

The calculating module 6053 is configured to obtain the intermediate MAC2 bits of the physical address by negating the mask and performing a bitwise AND operation on the negated Mask and the second address.

The calculating module 6053 is further configured to obtain the lower-order ($\log_2$ P1) bits of the physical address, where P1 represents the supported minimum page size.

The combining module 6054 is configured to obtain the physical address by combining the higher-order MAC1 bits of the physical address, the intermediate MAC2 bits of the physical address, and the lower-order ($\log_2$ P1) bits of the physical address in sequence.

It should be noted that, because content such as specific implementation processes of various modules and information exchange between the various modules in the apparatus shown in FIG. 6 or FIG. 7 is based on a same disclosure concept as the embodiment of the present disclosure, reference may be made to the method embodiment and repeated description is not provided herein.

This embodiment of the present disclosure provides an apparatus for determining a physical address, in which a page size decoder obtains a page size according to the higher-order N bits of a linear address, where N is greater than 0 and less than a quantity of bits of the linear address; an index processor obtains an index number of a translation lookaside buffer TLB according to the page size; a label processor obtains a label of the TLB according to the page size; a physical address determining unit obtains, by searching the TLB according to the index number and the label, a physical address corresponding to the linear address. A set associative TLB that supports multiple page sizes may be used to obtain the physical address, so that a process uses different page sizes in different linear address areas and power consumption is reduced.

It should be noted that the described apparatus embodiment is merely exemplary. The units described as separate parts may or may not be physically separate, and parts displayed as units may or may not be physical units, and may be located in one position or may be distributed on a plurality of network units. Some or all of the modules may be selected according to actual needs to achieve the objectives of the solutions of the embodiments. A person of ordinary skill in the art may understand and implement the embodiments of the present disclosure without creative efforts.

Based on the description of the foregoing implementation manners, a person skilled in the art may clearly understand that the present disclosure may be implemented by software in addition to necessary universal hardware, or by dedicated hardware, including a dedicated integrated circuit, a dedicated CPU, a dedicated memory, a dedicated component, and the like. In most circumstances, the former is a preferred implementation manner. Based on such an understanding, the technical solutions of the present disclosure essentially or the part contributing to the prior art may be implemented in a form of a software product. The software product is stored in a readable storage medium, such as a floppy disk, a USB flash drive, a removable hard disk, a read-only memory (ROM, Read-Only Memory), a random access memory (RAM, Random Access Memory), a magnetic disk, or an optical disc of a computer, and includes several instructions for instructing a computer device (which may be a personal computer, a server, a network device, and the like) to perform the methods described in the embodiments of the present disclosure.

The embodiments in this specification are all described in a progressive manner, for same or similar parts in the embodiments, reference may be made to these embodiments, and each embodiment focuses on a difference from other embodiments. Especially, apparatus and system embodiments are basically similar to a method embodiment, and therefore are described briefly; for related parts, reference may be made to partial descriptions in the method embodiment.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for determining a physical address, which is used to convert a linear address into the physical address, comprising:
    obtaining a page size according to higher-order N bits of the linear address, wherein N is greater than 0 and less than a quantity of bits of the linear address;
    obtaining an index number of a translation lookaside buffer TLB according to the page size;
    obtaining a mask according to the page size and a supported minimum page size;
    obtaining a label of the TLB according to the mask;
    obtaining, by searching the TLB according to the index number and the label, higher-order bits of a physical address corresponding to the linear address; and
    obtaining the physical address according to the mask, the supported minimum page size, and the higher-order bits of the physical address, wherein the physical address is used for memory access.

2. The method according to claim 1, wherein the obtaining a page size according to the higher-order N bits of a linear address comprises:
    obtaining a quantity of page offset bits of the minimum page size according to the supported minimum page size;
    obtaining a first page number by taking the page offset bits of the minimum page size from bits of the linear address; and
    obtaining the page size by querying a first preset table according to a value of the first page number.

3. The method according to claim 2, wherein the first preset table comprises a start address of the page size, an end address of the page size, and the page size; and
    the obtaining the page size by querying the first preset table according to a value of the first page number comprises:
    when the value of the first page number is greater than the start address of the first page size and the value of the first page number is less than an end address of the first page size, determining that the page size is the first page size.

4. The method according to claim 1, wherein the obtaining the page size according to the higher-order N bits of the linear address comprises:
    obtaining a gating signal by inputting the higher-order N bits of the linear address into a decoder, wherein the gating signal is used to select a register from a register group;
    determining a first register in the register group according to the gating signal; and
    determining that the page size is a page size recorded by the first register; wherein
    the page size recorded by each register in the register group is the page size recorded, after the linear address is equally divided into $2^N$ memory areas according to the higher-order N bits of the linear address, in each memory area.

5. The method according to claim 1, wherein the obtaining the index number of a TLB according to the page size comprises:
    determining, according to rows of records stored in the TLB, bits that represent a row number of the TLB;
    determining a quantity of the page offset bits of the page size according to the page size; and
    after taking the page offset bits of the page size from the bits of the linear address, determining that lower-order bits that represent a row number of the TLB and are of a remaining part of the linear address are the index number of the TLB.

6. The method according to claim 1, wherein the obtaining a Mask according to the page size and a supported minimum page size comprises:
obtaining a quantity of bits of the mask according to M1=LA−$\log_2$ P1, wherein M1 represents the quantity of bits of the mask, LA represents the quantity of bits of the linear address, and P1 represents the supported minimum page size;
obtaining a quantity of 1s in the Mask according to M2=LA−$\log_2$ P2, wherein M2 represents the obtained quantity of 1s in the mask, and P2 represents the page size; and
obtaining the mask by setting higher-order M2 bits in the M1 bits to 1 and setting lower-order (M1−M2) bits in the M1 bits to 0.

7. The method according to claim 6, wherein the obtaining the label of the TLB according to the mask comprises:
obtaining a second address by taking lower-order ($\log_2$ P1) bits from the linear address; and
obtaining the label of the TLB by performing a bitwise AND operation on the mask and the second address.

8. The method according to claim 1, wherein the obtaining, by searching the TLB according to the index number and the label, the higher-order MAC1 bits of the physical address corresponding to the linear address comprises:
obtaining a first record in the TLB by searching the TLB according to the index number of the TLB, wherein the TLB comprises at least one row of record, each row of record comprises at least one pair of data, and each pair of the data comprises a label and a physical address corresponding to the label; and
comparing the label of the TLB with each label in at least one pair of data comprised in the first record, wherein when the label of the TLB is the same as a first label comprised in the first record, a physical address that is corresponding to the first label and is in the first record is the higher-order bits of the physical address corresponding to the linear address.

9. The method according to claim 8, wherein the obtaining the physical address according to the mask, the supported minimum page size, and the higher-order bits of the physical address comprises:
obtaining intermediate bits of the physical address by negating the mask and performing a bitwise AND operation on the negated Mask and the second address;
obtaining lower-order ($\log_2$ P1) bits of the physical address, wherein P1 represents the supported minimum page size; and
obtaining the physical address by combining the higher-order bits of the physical address, the intermediate bits of the physical address, and the lower-order ($\log_2$ P1) bits of the physical address in sequence.

10. An apparatus for determining a physical address, which is configured to convert a linear address into the physical address, comprising:
a page size decoder, configured to obtain a page size according to higher-order N bits of the linear address, wherein N is greater than 0 and less than a quantity of bits of the linear address;
an index processor, configured to obtain an index number of a translation lookaside buffer TLB according to the page size;
a mask decoder, configured to obtain a Mask according to the page size and a supported minimum page size;
a label processor, configured to obtain a label of the TLB according to the mask; and
a physical address determining unit, configured to obtain, by searching the TLB according to the index number and the label, higher-order bits of a physical address corresponding to the linear address; wherein
the physical address determining unit is further configured to obtain the physical address according to the mask, the supported minimum page, and the higher-order bits of the physical address, wherein the physical address is used for memory access.

11. The apparatus according to claim 10, wherein the page size decoder is further configured to:
obtain a quantity of page offset bits of the minimum page size according to the supported minimum page size,
obtain a first page number by taking the page offset bits of the minimum page size from bits of the linear address; and
obtain the page size by querying a first preset table according to a value of the first page number.

12. The apparatus according to claim 11, wherein the first preset table comprises a start address of the page size, an end address of the page size, and the page size; and
the page size decoder is configured to:
when the value of the first page number is greater than the start address of the first page size and the value of the first page number is less than an end address of the first page size, determine that the page size is the first page size.

13. The apparatus according to claim 10, wherein the page size decoder comprises:
a decoder, configured to obtain a gating signal by inputting the higher-order N bits of the linear address into the decoder, wherein the gating signal is used to select a register from a register group; and
the register, configured to determine a first register in the register group according to the gating signal; wherein
the register is further configured to determine that the page size is a page size recorded by the first register; and
the page size recorded by each register in the register group is the page size recorded, after the linear address is equally divided into $2^N$ memory areas according to the higher-order N bits of the linear address, in each memory area.

14. The apparatus according to claim 10, wherein the index processor comprises:
an index decoder, configured to determine, according to a quantity of rows of records stored in the TLB, a quantity of bits that represent a row number of the TLB;
the index decoder is further configured to determine a quantity of page offset bits of the page size according to the page size; and
a multiplexer MUX, configured to: after taking the page offset bits of the page size from the bits of the linear address, determine that lower-order bits that represent a row number of the TLB and are of a remaining part of the linear address are the index number of the TLB.

15. The apparatus according to claim 14, wherein the mask decoder is configured to:
obtain a quantity of bits of the mask according to M1=LA−$\log_2$ P1, wherein M1 represents the quantity of bits of the mask, LA represents the quantity of bits of the linear address, and P1 represents the supported minimum page size;

obtain a quantity of 1s in the Mask according to M2=LA−$\log_2$ P2, wherein M2 represents the obtained quantity of 1s in the Mask, and P2 represents the page size; and obtain the mask by setting higher-order M2 bits in the M1 bits to 1 and setting lower-order (M1−M2) bits in the M1 bits to 0.

16. The apparatus according to claim 15, wherein the label processor is configured to:

obtain a second address by taking lower-order ($\log_2$ P1) bits from the linear address; and obtain the label of the TLB by performing a bitwise AND operation on the mask and the second address.

17. The apparatus according to claim 16, wherein the physical address determining unit is further configured to:

obtain a first record in the TLB by searching the TLB according to the index number of the TLB, wherein the TLB comprises at least one row of record, each row of record comprises at least one pair of data, and each pair of the data comprises a label and a physical address corresponding to the label; and compare the label of the TLB with each label in at least one pair of data comprised in the first record, wherein when the label of the TLB is the same as a first label comprised in the first record, a physical address that is corresponding to the first label and is in the first record is the higher-order bits of the physical address corresponding to the linear address.

18. The apparatus according to claim 17, wherein the physical address determining unit is further configured to:

obtain intermediate bits of the physical address by negating the mask and performing a bitwise AND operation on the negated Mask and the second address; wherein obtain the lower-order ($\log_2$ P1) bits of the physical address, wherein P1 represents the supported minimum page size; and obtain the physical address by combining the higher-order bits of the physical address, the intermediate bits of the physical address, and the lower-order ($\log_2$ P1) bits of the physical address in sequence.

* * * * *

UNITED STATES PATENT AND TRADEMARK OFFICE
CERTIFICATE OF CORRECTION

PATENT NO. : 10,303,619 B2
APPLICATION NO. : 14/951608
DATED : May 28, 2019
INVENTOR(S) : Lixin Zhang et al.

Page 1 of 1

It is certified that error appears in the above-identified patent and that said Letters Patent is hereby corrected as shown below:

In the Claims

Column 17, Line 27:
In Claim 8, after "higher-order" delete "MAC1".

Signed and Sealed this
Twenty-sixth Day of November, 2019

Andrei Iancu
*Director of the United States Patent and Trademark Office*